Aug. 5, 1958 P. H. TAYLOR 2,846,211
SPRING UTILIZING A COMPRESSIBLE SOLID
Filed April 26, 1954

INVENTOR.
Paul H. Taylor
BY
Attorney.

United States Patent Office 2,846,211
Patented Aug. 5, 1958

2,846,211

SPRING UTILIZING A COMPRESSIBLE SOLID

Paul H. Taylor, Grand Island, N. Y., assignor to Wales-Strippit Corporation, North Tonawanda, N. Y., a corporation of New York Application April 26, 1954, Serial No. 425,702

5 Claims. (Cl. 267—63)

The present invention relates to springs, and more particularly springs which make use of the compressibility of solids to achieve their purposes. In a more specific aspect the invention relates to a spring of the type disclosed in my pending U. S. patent applicaiton Serial No. 272,878, filed February 21, 1952, now Patent No. 2,681,800, granted June 22, 1954.

In the spring of the present invention, as in the spring of my prior application above mentioned, resiliency is obtained through use of a compressible solid in the form of a column or body. Preferably a plastic, such as a dense and hard silicone is used, although other plastics, such as Lucite, polystyrene, cellulose acetate, nylon, etc. can be employed also, depending on the loads desired.

The compressible material is placed within a hollow container which is open at one end and has a piston mounted to reciprocate in said open end. The container seats at one end against one of the two relatively movable parts between which the spring is interposed; and the piston contacts the other of said parts. When a working load is applied to the spring the compressible material is compressed to absorb the load, and to return the piston, by increase in volume again, when the load is relieved.

Springs of this nature can be made much more compact for a given load-carrying capacity than can mechanical springs, such as coil or leaf springs. For this reason they have definite advantages for use in automobiles and in machine tools, such as punch presses. These springs have advantages over liquid springs also, in that they do not have the difficult sealing problem attendant upon use of a liquid, since the tendency of a solid to extrude past a gap in the seal is much less than the tendency of liquid to pass a seal. Liquid wets the cylinder wall and some unavoidably escapes past the seal in the operation of the spring, whereas the solid material tends to maintain itself as a homogeneous mass if ordinary precautions regarding use of the material in a spring are taken. Furthermore the solid type spring is much less subject to variation in spring pressure with variation in temperature. These springs have definite advantages, also, for airplane use because, having relatively great load-carrying capacity for relatively small size, they permit reduction of the weight penalty of the springs used to a minimum. These springs have the further advantage that their fatigue life is for all practical purposes substantially endless. These and other advantages of springs which make use of the compressibility of solids to achieve their purposes, are described at length in my patent above mentioned.

One object of the present invention is to provide a spring of the type employing a compressible solid as the resilient medium, which has a greater stroke for a given height than the spring disclosed in my application above mentioned.

Another object of the invention is to provide a spring, employing a compressible solid, in which the forces of compression applied thereto stress the compressible material equally in all directions.

Another object of the invention is to provide a spring of the character described in which the forces acting on the compressible solid are equally distributed but in which a greater volume of compressible material may be employed for a given height of spring.

Other objects of the invention will be apparent hereinafter from the specification and from the recital of the appended claims.

Figures 1, 2:
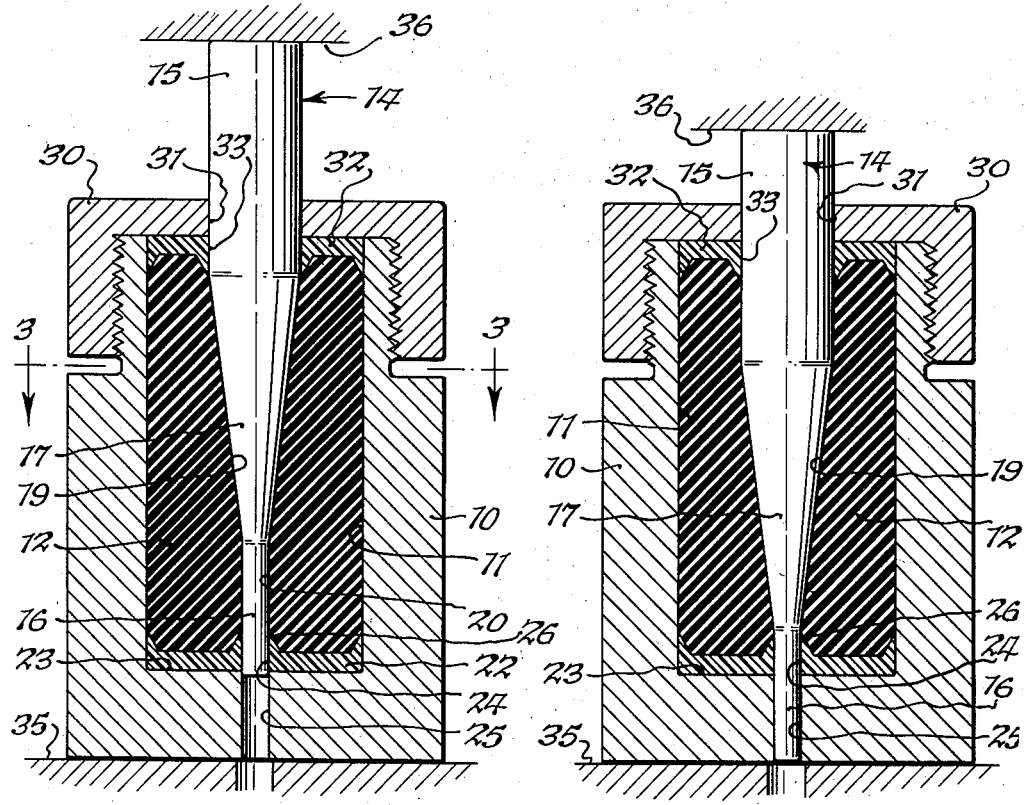
Fig. 1 is an axial section of a spring utilizing a compressible solid and constructed according to one embodiment of this invention, the spring being shown at rest in expanded position.
Fig. 2 is an axial section of this sring but showing it under full working load.
Figure 3:
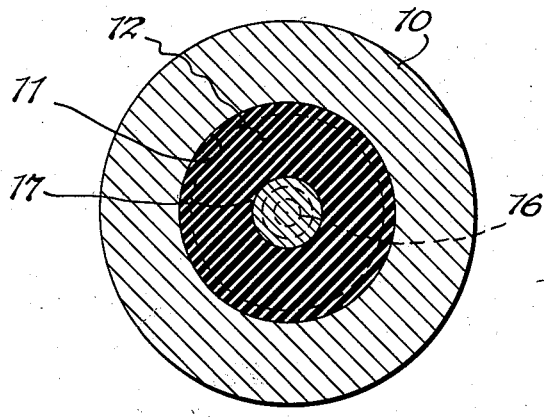
Fig. 3 is a section on the line 3—3 of Fig. 1 looking in the direction of the arrows.

Referring now to the drawing by numerals of reference, the spring shown comprises a hollow container 10 having a cylindrical bore 11 for receiving the compressible solid material 12. This solid material is preferably a hard silicone, such as a polysiloxane elastomer, but it may be polystyrene, cellulose acetate, nylon, or the like. Operating against the compressible plastic 12 is a plunger or piston 14 which has a cylindrical portion 15 at one end of relatively large diameter, a cylindrical portion 16 at its opposite end of considerably smaller diameter, and a conical, tapered intermediate portion 17 which joins at opposite ends with the two cylindrical portions and which blends into both providing a smooth transition from one cylindrical portion to the other. The compressible plastic 12 when at rest has a conical bore portion 19 to receive the conical section 17 of the plunger 14 and has a cylindrical bore portion 20 to receive the cylindrical section 16 of the plunger.

The compressible plastic 12 seats at its base on a sealing disc 22 which, in turn, rests on the bottom 23 of the bore 11 of the container. The disc 22 may be made of nylon or other suitable sealing material which is compressible but much less compressible than plastic solid 12. It has a central hole 24 in it through which the cylindrical section 16 of the plunger 14 extends and reciprocates. The base of the container is provided with an aligned hole 25 in which the cylindrical section 16 of the plunger can move when the spring is under working load.

The disc 22 prevents extrusion of the solid plastic 12 through hole 25 in the base of the container. To this end it is formed with an annular portion 26 around hole 24 which is of greater thickness than the general thickness of the disc and which is externally conical so as to tend to direct forces internally into the compressible plastic 12 away from opening 24 in the disc 22, thereby to minimize possibility of extrusion of the solid plastic. A similar, but internally conical, annulus at the periphery of disc 22 also directs forces internally into the compressible plastic 12 tending to equalize stresses applied thereto. Annular portion 26 also acts as a guide for cylindrical section 16 of the plunger in the reciprocating movement of the plunger.

The upper end of the container 10 is closed by a cap 30 which threads onto the container. The enlarged cylindrical section 15 of the plunger 14 projects outwardly of container through a hole 31 in the cap 30 which is aligned axially with hole 25 in the base of the container. A sealing disc 32 is interposed between the solid plastic 12 and cap 30 to prevent extrusion of the solid plastic 12 through hole 31 in cap 30. The enlarged section 15 of the plunger extends through a hole 33 in disc 32 which is aligned with hole 31 in cap 30. Holes 33 in disc 32 and 31 in cap 30 act as guides for the enlarged cylindrical section 15 of the plunger. Disc 32, like disc 22, has annular portions around hole 33 and at its periphery, respectively, which are of greater thickness than the thickness of the rest of the disc and which have external and internal conical surfaces, respectively, to distribute the stresses in the solid plastic 12. Disc 32, like disc 22, may be made of nylon. It is, also, like disc 22, preferably made of a material less compressible than solid plastic 12.

The seals 22 and 32 have tight fits within the bore of the container. Preferably they are even normally slightly larger in diameter than bore 11 so that compression is required to insert them in the bore.

The spring is adapted to be preloaded in use. It is mounted between the two relatively movable parts with which it is adapted to be used, such as the bed 35 and the ram 36 of a press. The spring may be preloaded by dimensioning it so that even when the ram 36 is in withdrawn position, shown in Fig. 1, the ram will exert a pressure through the piston or plunger 14 on the compressible solid 12 to distort the solid and cause the material 12, which is somewhat elastic, to fill the container, thereby placing the material under preload.

Preload of the spring occurs, therefore, through distortion of the plastic which is the conventional way in which rubber is used as an elastic spring material. In a spring made according to the present invention, preload is obtained by absorbing energy in the plastic 12 to distort the plastic from its normal shape to cause the plastic to fill the container. Of necessity this distortion produces a light load because distortion within the elastic limit of the material provides very low forces.

In operation, movement of the ram 36 toward the bed 35 forces the piston 14 inwardly of the container 10. Since the solid 12 is already under preload, and therefore already completely fills the inside of the chamber 10, the motion of the ram toward the bed causes the conical section 17 of the piston or plunger 14 to compress the molecules of the plastic 12 to such a point that the volume of the plastic 12 is actually reduced. It has been found that in the case of hard silicones a net reduction in volume of approximately 6% to as high as 9%, depending upon the material used, can be expected along with an internal pressure of 20,000 p. s. i. in the plastic.

One feature of the device of the present invention is the action of the conical section of the plunger. As the plunger moves inwardly of the container 10 under working load its conical section 17 stresses the plastic 12 equally in all directions. An outstanding advantage of the present spring is that for a given height of spring a greater stroke can be obtained than with the device shown in the drawing of my prior patent above mentioned. In the spring of my application above mentioned, the entire column of compressible plastic is compressed for its full height; reduction of 6% in volume means 6% reduction in height. In the spring of the present application, however, the solid plastic 12 is stressed equally in all directions; the conical section 17 of the plunger 14 compresses the plastic outwardly as well as downwardly on the downward stroke of the plunger; and the net force is the differential in area between piston sections 15 and 16. Therefore, with the spring of the present invention a longer stroke of the piston or plunger is possible than is attainable with the spring of my prior application above mentioned, since maximum reduction in volume of the compressible plastic 12 is not directly related to the length of stroke of the plunger.

While other materials than hard silicones may be utilized in a spring made according to this invention it is economically desirable to use materials having the greatest compressibility, such as the hard silicones, which, as stated, have a minimum compressibility of about 6%. In addition, there is another reason for using silicones, that is, in operation of a spring made according to the present invention, the working of the solid material therein will of necessity produce heat. Silicones have a natural resistance to high heat and their use in a spring of the character herein described is particularly advantageous because silicones do not deteriorate from heat, and heat does not have any deleterious effects on such materials even in the presence of the lubricants used.

The seals are made preferably of nylon or a similar material, when a silicone solid is used in the spring, because it has been found that the silicones tend to cause seizure and scoring when they get between relatively movable parts made of ferrous material, whereas nylon remains unaffected.

While the invention has been described in connection with the embodiment thereof in a press, it will be obvious that the spring of this invention may be employed in various applications where it is desired to resiliently support one part upon another, or it is desired to use resilient means for returning one part after movement of that part toward another. The device of the present invention is particularly useful where conventional mechanical springs formed of steel wire or steel leaves provide insufficient power and yet where the cost of liquid springs is prohibitive. The invention has application, however, wherever mechanical springs are at present employed.

While the invention has been described in connection with a particular embodiment thereof and a particular use therefor, then, it will be understood that it is capable of further modification and use, and that this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A self-contained spring comprising a container having a chamber, a plunger extending through said chamber and reciprocable therein, said plunger having cylindrical sections at its opposite ends which are of different diameter, respectively, and an intermediate conical section connecting said cylindrical sections, a compressible solid plastic disposed in said chamber around said plunger to be compressed under a working load and to return said plunger to its starting position upon release of said load, said plunger being closed against passage therethrough of said plastic, and sealing discs disposed in said chamber at opposite ends of said chamber to prevent extrusion of said plastic from said chamber, said sealing discs having axially aligned guide holes through which opposite ends of said plunger pass and by which said plunger is guided in its reciprocatory movement, said sealing discs being made of a compressible solid plastic which has less compressibility than the first-named plastic.

2. A spring comprising a container having a chamber, a plunger extending through said chamber and reciprocable therein, said plunger having cylindrical sections at its opposite ends which are of different diameter, respectively, and an intermediate conical section connecting said cylindrical sections, a compressible solid plastic disposed in said chamber around said plunger to be compressed under a working load and to return said plunger to its starting position upon release of said load, said plunger being closed against passage therethrough of said plastic, and sealing discs disposed in said chamber at opposite ends of said chamber to prevent extrusion of said plastic from said chamber, said sealing discs having axially aligned guide holes through which opposite ends of said plunger pass and by which said plunger is guided in its reciprocatory movement, said sealing discs having external and internal conical surfaces around said holes and at their peripheries, respectively, to aid in distribution of stresses throughout said plastic.

3. A spring comprising a container having a chamber, a plunger extending through said chamber and reciprocable therein, said plunger having cylindrical sections at its opposite ends which are of different diameter, respectively, and an intermediate conical section connecting said cylindrical sections, a compressible solid plastic disposed in said chamber around said plunger to be compressed under a working load and to return said plunger to its starting position upon release of said load, said plunger being closed against passage therethrough of said plastic, and sealing discs disposed in said chamber at opposite ends of said chamber to prevent extrusion of said plastic from said chamber, said sealing discs having axially aligned guide holes through which opposite ends of said plunger pass and by which said plunger is guided in its reciprocatory movement, said sealing discs having external and internal conical surfaces around said holes and at their peripheries, respectively, to aid in distribution of stresses throughout said plastic, and said sealing discs being made of a compressible solid plastic which has less compressibility than the first-named plastic.

4. A self-contained spring comprising a container having a cylindrical chamber therein, a cap secured to said container to close said chamber at one end, a plunger reciprocable in said container and through a hole in said cap, said plunger having axially-aligned cylindrical sections of different diameter at opposite ends, respectively, and having an intermediate, coaxial conical section connecting said cylindrical sections, a compressible solid plastic disposed in said chamber and surrounding said plunger to be compressed under a working load and to return said plunger to its starting position upon release of said load, said plunger being closed against passage therethrough of said plastic, a pair of sealing discs in said chamber at opposite ends of said chamber and having aligned holes through which the cylindrical portions of said plunger move as said plunger reciprocates, said sealing discs being made of a hard compressible plastic which is less compressible than the first-named plastic, said spring being adapted to be used under preload, and said first-named plastic when under such preload filling the space in said chamber around said plunger and between said sealing discs.

5. A self-contained spring comprising a container having a cylindrical chamber therein, a cap secured to said container to close said chamber at one end, a plunger reciprocable in said container and through a hole in said cap, said plunger having axially-aligned cylindrical sections of different diameter at opposite ends, respectively, and having an intermediate, coaxial conical section connecting said cylindrical sections, a compressible solid plastic disposed in said chamber and surrounding said plunger to be compressed under a working load and to return said plunger to its starting position upon release of said load, said plunger being closed against passage therethrough of said plastic, a pair of sealing discs in said chamber at opposite ends of said chamber and having aligned holes through which the cylindrical portions of said plunger move as said plunger reciprocates, said sealing discs being made of a hard compressible plastic which is less compressible than the first-named plastic, said spring being adapted to be used under preload, and said first-named plastic when under such preload filling the space in said chamber around said plunger and between said sealing discs, said first-named plastic being a hard, dense silicone, and the plastic of said sealing discs being nylon.

References Cited in the file of this patent

UNITED STATES PATENTS

| | | |
|---|---|---|
| 254,917 | Canet | Mar. 14, 1882 |
| 2,346,667 | Dowty | Apr. 18, 1944 |
| 2,460,116 | Bazley | Jan. 25, 1949 |
| 2,567,527 | Parks | Sept. 11, 1951 |
| 2,570,854 | Pierce | Oct. 9, 1951 |
| 2,668,049 | Taylor | Feb. 2, 1954 |

FOREIGN PATENTS

| | | |
|---|---|---|
| 19,344 | Great Britain | of 1912 |